Nov. 3, 1936. L. SIMON 2,059,818
SCIENTIFIC SNOW REMOVAL AND SELF LOADING TRUCK
Filed May 20, 1936 2 Sheets-Sheet 1
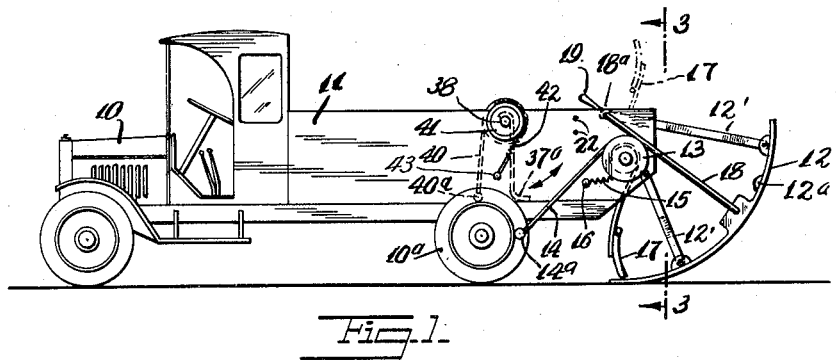
INVENTOR
Louis Simon
BY
ATTORNEY Nov. 3, 1936.  L. SIMON  2,059,818
SCIENTIFIC SNOW REMOVAL AND SELF LOADING TRUCK
Filed May 20, 1936    2 Sheets-Sheet 2

INVENTOR
Louis Simon
BY
ATTORNEY

Patented Nov. 3, 1936

2,059,818

UNITED STATES PATENT OFFICE 2,059,818

SCIENTIFIC SNOW REMOVAL AND SELF LOADING TRUCK

Louis Simon, New York, N. Y.

Application May 20, 1936, Serial No. 80,677

12 Claims. (Cl. 37—5)

This invention relates to new and useful improvements in a snow removal and self loading truck.

It is the purpose of this invention to provide a snow removal and self loading truck which may be rapidly used during or after a snow fall or blizzard and thus avoid accidents.

The invention has for an object the association with a truck having a body including a bottom wall and side walls, of an arcuate snow scoop supported on the rear thereof and adapted to scoop up the snow when the truck moves forward, and associated with a novel mechanism for loading this snow upon the truck.

More specifically, the invention proposes the provision of a pulley rotative on one of the side walls of the truck body and connected with an oscillating means, and associated with a carrier rotatively supported on the truck so as to move along inside the scoop from a lower to a raised position and lift snow therein, and depositing it in the truck.

Still further the invention contemplates the provision of a means for automatically connecting the carrier with the said mentioned pulley on the forward turn of the pulley.

Also the invention proposes the provision of a mechanism for disconnecting the carrier from the pulley when the latter reaches the ends of its forward turn.

Another object of the invention resides in the provision of a means for returning the carrier to its lowered position.

Still further the invention proposes the provision of an auxiliary carrier on the truck adapted to move snow from the rear to the front while the truck is moving.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a snow truck constructed according to this invention.

Fig. 2 is a plan view of Fig. 1.

Fig. 3 is a fragmentary sectional view taken on the line 3—3 of Fig. 1.

Fig. 4 is a fragmentary sectional view taken on the line 4—4 of Fig. 3.

Figures 5, 6:
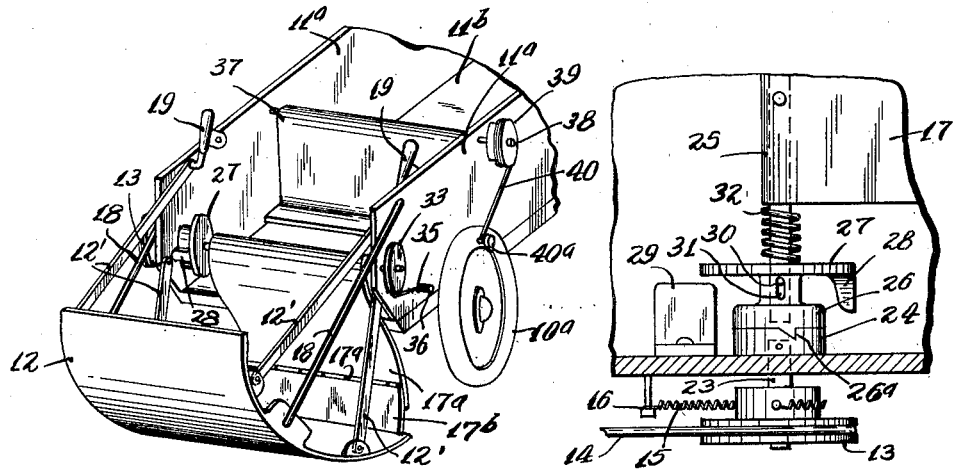
Fig. 5 is a horizontal sectional view taken on the line 5—5 of Fig. 4.
Fig. 6 is a perspective view of the rear portion of the truck.

The invention is incorporated on a conventional truck 10 which has a body 11 formed with side walls 11$^a$ and a bottom wall 11$^b$. An arcuate snow scoop 12 is pivotally supported upon the rear of the truck by straps 12' and is adapted to scoop up the snow when the truck moves forwards. A pulley 13 is rotatively mounted on one of the side walls 11$^a$ at the rear extremity of the body.

A means is associated with one of the wheels of the truck for oscillating the pulley 13 forwards and rearwards. This means includes a cable 14 which is secured at the end 14$^a$ eccentrically on one of the wheels 10$^a$ of the truck and which is attached at its other end of the pulley 13. Counterbalancing the pull of the cord 14 when the wheel 10$^a$ turns there is a spring 15 which is also attached on the pulley at one of its ends, and at its other end is attached upon a pin 16 mounted on the side wall 11$^a$ of the body.

A carrier 17 is rotatively supported on the truck and arranged to move along the scoop 12 from a lowered to a raised position for lifting snow therefrom and depositing it in the truck. Abutments 12$^a$ are provided on the scoop 12 near its upper end for momentarily retarding the upward motion of the carrier 17 and thereafter accelerating the motion, thus throwing the snow upward. The carrier is associated with a means for operatively connecting with the pulley 13 on the forward turn of the pulley and also with a means for disconnecting it from the pulley when the pulley reaches the end of its forward turn. A means is also associated with the carrier for returning it back to its lowered position.

Figure 7:
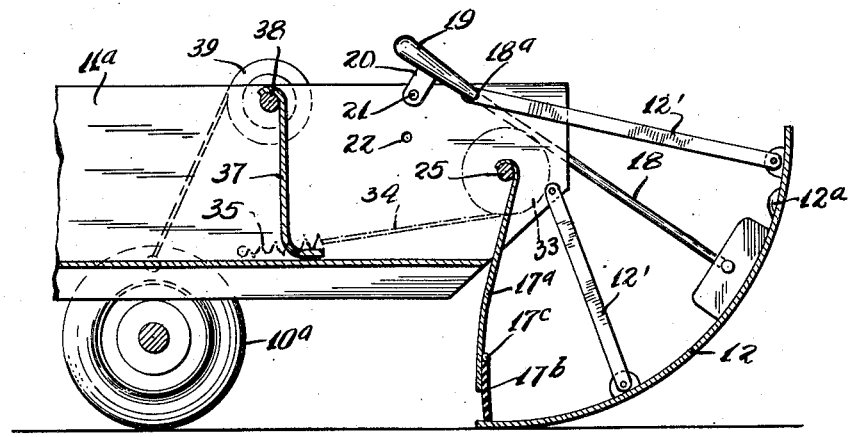
Fig. 7 is a fragmentary sectional view taken on the line 7—7 of Fig. 3.

The arcuate snow scoop 12 is adjustably supported on the truck so that it may be slightly raised and lowered to engage or disengage its operative bottom edge from contact, or close spacing from the ground. Specifically, a pair of arms 18 is connected with the sides of the scoop 12 and at its rear portions 18$^a$ is pivotally connected with the side walls 11$^a$ of the truck by reason of offset portions thereof (see Fig. 3) passing through the side walls. On the inner ends the arms 18 are provided with handles 19 by which the scoop 12 may be moved. These handles are associated with lugs 20 having studs 21 engageable with several of certain tapped openings 22 formed in the side walls 11$^a$. In the position of the scoop shown in Fig. 7 the front edge thereof is in contact with the ground. If it is desired the studs 21 may be disengaged, the arms 18 pivoted, and the studs re-engaged in other of the tapped openings 22. Thus the scoop may be supported in several raised positions.

The pulley 13 is fixed upon a shaft 23 which is rotative through one side wall 11ª. On the inner end this shaft 23 supports a disc shaped clutch jaw 24. This clutch jaw acts against the inner face of the wall 11ª to hold the pulley rotatively in position.

The spring 15 continuously acts to turn the pulley 13 clockwise, while the cord 14 acts to turn the pulley anti-clockwise during a certain 180° rotation of the truck wheel 10ª. The combined action serves to oscillate the pulley 13 forwards and rearwards through a pre-determined angular distance.

The carrier 17 comprises a main body portion 17ª which is fixed upon a shaft 25. This shaft is rotative through the other wall 11ª and at its other end has a bearing within the disc jaw 24. The other section of the carrier 17 comprises a rubber or other flange lip piece 17ᵇ which is hingedly mounted at its upper end 17ᶜ upon a lower portion of the section 17ª. The arrangement is such that when the carrier 17 turns anti-clockwise all snow and material on the scoop will be forced upwards, but on the return stroke of the carrier the section 17ᵇ is capable of itself shifting anti-clockwise while the carrier merely idles back to its lowered position. When the carrier is again moved forward the lower portion 17ᵇ will immediately be back in operative position.

The means for operatively connecting the carrier 17 with the pulley 13 on the forward turn of the pulley comprises a complementary clutch jaw 26 mounted on the shaft 25 and having a tooth 26ª engageable with a corresponding recess in the clutch jaw 24. Thus, when the clutch jaw 24 turns anti-clockwise the clutch jaw 26 is correspondingly turned, and hence the shaft 25 is turned.

The means for disconnecting the carrier from the pulley 13 when the pulley reaches the end of its forward stroke, comprises a disc shaped piece 27 which is connected with the clutch jaw 26 and which is provided with a cam 28 adapted in a certain position of the shaft 25 to strike against a standard 29 which is fixed on the side wall 11ª. This cam 28 is so constructed that the disc 27 will be forced rearwards, and since the disc is connected with the clutch jaw 26, the clutch jaw will be correspondingly moved. The tooth 26ª will thus disengage from the recess in the jaw 24 and the parts will be disconnected. The jaw 26 is spliced or simultaneously connected upon the shaft 25 by reason of a pin 30 projecting from the shaft and working in a slot 31 on the hub portion of the jaw 26. A spring 32 is coaxially arranged upon the shaft 25 and acts between the carrier 17 and the disc 27 to normally urge the jaw into engaged positions.

A means is provided for returning the carrier 17 to its lowered position immediately upon its release from the pulley 13. This means consists of a pulley 33 fixed upon the extended end of the shaft 25 and carrying a cord 34 which is connected with the spring 35 mounted at its free end upon a stud 36 carried by the wall 11ª.

An auxiliary carrier is mounted on the truck and is adapted to move snow from the rear of the truck to the front of the truck. This auxiliary carrier comprises a radial carrier body 37 fixed on a shaft 38 rotative between the side walls 11ª. Upon one extended end of the shaft 38 there is a pulley 39 over which a cord or cable 40 engages. This cable is eccentrically connected at the point 40ª with the wheel 10ª. On the other extended end of the shaft 38 there is a pulley 41 over which a spring 42 engages, the free end of this spring being connected upon a stud 43 mounted upon the side wall 11ª. The action of the cable 40 and the spring 42 will be to cause the shaft 38 to oscillate. This will oscillate the carrier 37. The extremity of the carrier has a hook shaped portion 37ª adapted to scoop up the snow and carry it around for slightly more than 180° and throw it to the front of the truck.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a truck having a body including a bottom wall and side walls, an arcuate snow scoop supported on the rear of said truck and adapted to scoop up snow when the truck moves forward, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position.

2. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position, said arcuate snow scoop being adjustably supported.

3. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position, said arcuate snow scoop being adjustably supported, by reason of a pair of arms connected therewith and pivotally mounted on the side walls of the truck body and associated with holding means.

4. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position, said arcuate snow scoop being adjustably supported, by reason of a pair of arms connected therewith and pivotally mounted on the side walls of the truck body and associated with holding means, comprising studs passing through lugs upon handle ends of said rods and engaging certain of a plurality of tapped openings in said side walls.

5. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position, said carrier comprising a body portion and a lip portion hingedly connected therewith and adapted to be operative when the carrier moves forwards and to pivot to an inoperative position when the carrier moves rearwards.

6. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position, said means for oscillating the pulley comprising a cable upon the perimeter of the pulley and connected eccentrically with one of the wheels of the truck, and a spring associated with the pulley to turn the pulley in the opposite direction to the turning tendency of said cable.

7. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position, said means for operatively connecting the carrier and the pulley comprising a jaw disc fixedly connected with the pulley and cooperative with a complementary jaw disc slidably associated with the carrier and urged into operative position.

8. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position, said means for operatively connecting the carrier and the pulley comprising a jaw disc fixedly connected with the pulley and cooperative with a complementary jaw disc slidably associated with the carrier and urged into operative position, said means for disconnecting the carrier including a cam associated with one of said jaws and engageable against a standard mounted on the side wall.

9. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, and means for returning said carrier to its lowered position, said means for operatively connecting the carrier and the pulley comprising a jaw disc fixedly connected with the pulley and cooperative with a complementary jaw disc slidably associated with the carrier and urged into operative position, said means for disconnecting the carrier including a cam associated with one of said jaws and engageable against a standard mounted on the side wall, said means for returning the carrier comprising a pulley upon the projecting end of a shaft supporting said carrier and associated with a spring urging the carrier into the lowered position.

10. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, means for returning said carrier to its lowered position, and an auxiliary carrier on the truck to move the snow from the rear to the front.

11. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, means for returning said carrier to its lowered position, and an auxiliary carrier on the truck to move the snow from the rear to the front, including a shaft rotatively supported on said side walls and supporting said carrier, a pulley upon one end of the shaft associated with a cable connected eccentrically with one of the wheels of said truck, and resilient means for urging the shaft in the other direction.

12. In combination with a truck having a body including a bottom wall and side walls, an arcuate snow scoop supported on the rear of said truck and adapted to scoop up snow when the truck moves forwards, a pulley rotative on one of said side walls at the rear extremity of said body, means associated with one wheel of said truck for oscillating said pulley forwards and rearwards, a carrier rotatively supported on said truck so as to move along said scoop from a lowered to a raised position for lifting snow therefrom and depositing it in said truck, means for operatively connecting said carrier with said pulley on the forward turn of said pulley, means for disconnecting said carrier from said pulley when the pulley reaches the end of its forward turn, means for returning said carrier to its lowered position, and an auxiliary carrier on the truck to move the snow from the rear to the front, including a shaft rotatively supported on said side walls and supporting said carrier, a pulley upon one end of the shaft associated with a cable connected eccentrically with one of the wheels of said truck, and resilient means for urging the shaft in the other direction, including a second pulley fixed on the shaft and a spring acting between the periphery of said pulley and said truck body.

LOUIS SIMON.